United States Patent [19]

Anctil et al.

[11] Patent Number: 4,484,963
[45] Date of Patent: Nov. 27, 1984

[54] METHOD FOR FABRICATING AN OPTICAL FIBER CABLE

[75] Inventors: Stephen N. Anctil, Rochester, N.H.; Robert F. Gleason, Freehold, N.J.; Don A. Hadfield, North Hampton; John S. B. Logan, Jr., Dover, both of N.H.; Alfred G. Richardson, Aberdeen, N.J.

[73] Assignee: AT&T Bell Laboratories, Murray Hill, N.J.

[21] Appl. No.: 469,429

[22] Filed: Feb. 24, 1983

[51] Int. Cl.³ .............................................. H01B 13/26
[52] U.S. Cl. .................................... 156/56; 29/825; 72/278; 72/367; 156/172; 174/106 R; 264/1.5; 350/96.23

[58] Field of Search ................... 29/825; 72/278, 367; 156/50, 52, 54, 56, 172; 174/106 R; 350/96.23; 264/1.5

[56] References Cited

U.S. PATENT DOCUMENTS 4,156,104  5/1979  Mondello .................... 174/106 R X
4,158,478  6/1979  D'Auria et al. ................. 350/96.23
4,408,828 10/1983  Le Noane et al. ............... 350/96.23

Primary Examiner—Robert Dawson
Attorney, Agent, or Firm—Richard B. Havill

[57] ABSTRACT

There is disclosed a method for fabricating an undersea communications cable containing optical fibers. The cable is fabricated so that fiber optical loss characteristics vary only slightly with changes in strain in the cable. During fabrication an adhesive bonds the cable core containing the optical fibers to a layer of steel wire for preventing creep therebetween.

9 Claims, 5 Drawing Figures

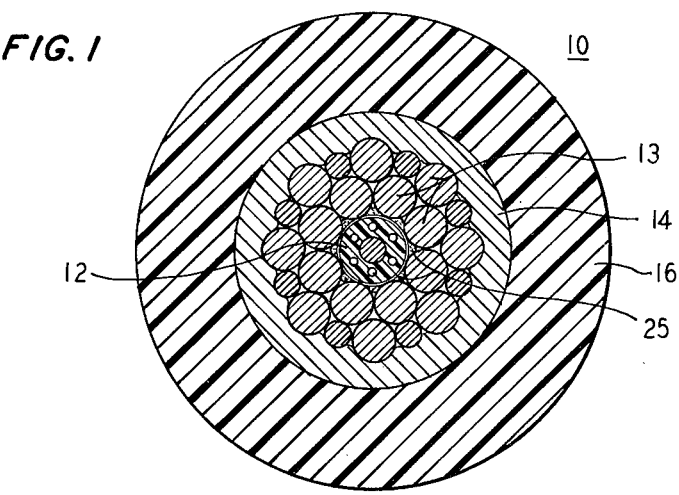
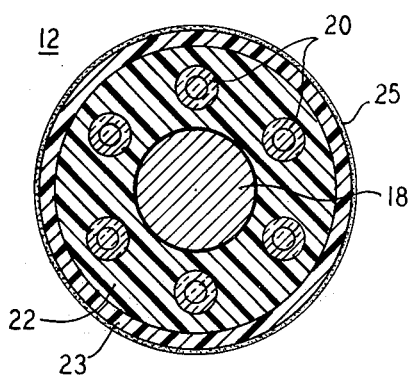
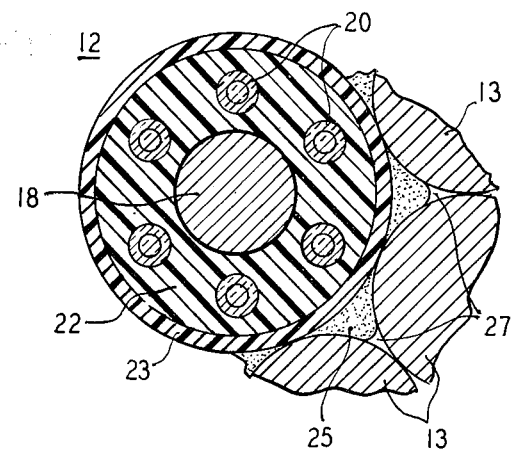
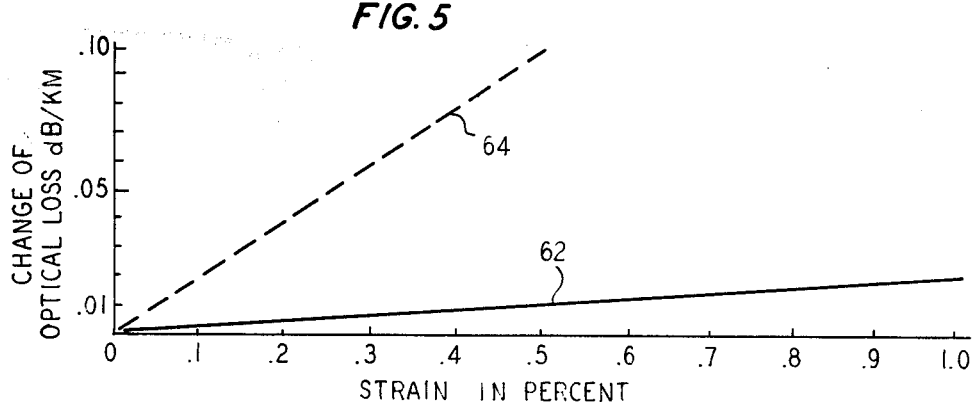

METHOD FOR FABRICATING AN OPTICAL FIBER CABLE

BACKGROUND OF THE INVENTION

The invention relates to a method for fabricating a communications cable containing optical fibers.

Coaxial undersea communications cables have been manufactured for analog telecommunications systems. Those cables have been fabricated to withstand some obvious environmental factors such as low temperature, high compressive pressure and corrosive water. Additionally undersea cables have been made to withstand large tensile and bending stresses encountered during cable laying and recovery operations.

Recent advances in the field of optical fiber communications technology have made possible some practical optical fiber commuciations systems. The characteristics of these systems, such as digital format, wide bandwidth and long repeater spacings, lead to what appears to be a relatively low cost per channel mile. This potential low cost makes an undersea communications cable containing optical fibers an attractive alternative to present day analog coaxial communications cables.

Heretofore, an undersea cable containing optical fibers was described in U.S. Pat. No. 4,156,104, issued to R. C. Mondello. Such cable included stranded steel wires separated from a central filament by a core in which the fibers are embedded.

A problem arises in the fabrication of a cable including optical fibers for use in an undersea communication system. The measured loss of the optical fibers included in the cable is dependent upon strain in the cable. Any large fluctuation in strain in the cable during manufacture, deployment, or operation of the cable system complicates the processes of starting up, lining up and operating the undersea communication system.

SUMMARY OF THE INVENTION

This problem is solved by fabricating an optical fiber cable through the following steps. A cable core including optical fibers is coated with adhesive. A layer of steel wire is wound over the adhesive on the cable core. A conducting metal tube is formed over the layer of steel wire. The tube is swaged down onto the layer of steel wire.

BRIEF DESCRIPTION OF THE DRAWINGS

A better understanding of the invention may be derived from the following detailed description when that description is read in view of the appended drawings wherein:

FIG. 1 is a cross-sectional view of an embodiment of a communications cable including optical fibers;

FIG. 2 is an enlarged cross-sectional view of a core of the cable of FIG. 1;

FIG. 3 is an enlarged cross-sectional view of the core and parts of some strength members of the cable of FIG. 1;

FIG. 5 is a graph showing a comparison between the optical loss in fibers of a cable, made in accordance with a prior art process, and in fibers of another cable, made in accordance with the disclosed process, both as a function of the tensile strain in the cable.

DETAILED DESCRIPTION

Figure 4:
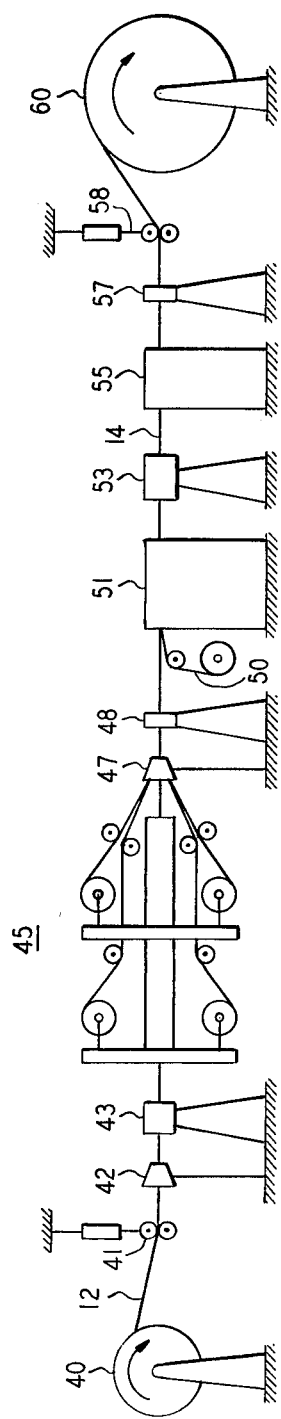
FIG. 4 is a diagrammatic side elevation view of a production line for manufacturing an optical fiber cable for communications.

Referring now to FIG. 1, there is shown a cross-section 10 of an undersea communications cable containing optical fibers arranged for transmission of optical signals. The cable includes a core 12, steel strand 13, a cylindrical conductor 14, and an insulator and protective jacket 16.

As shown in FIG. 2, the core 12 of the cable includes a central elongated strength member, or kingwire, 18, optical fibers 20 embedded in a thermoplastic elastomer 22, and a nylon sheath 23 surrounding the thermoplastic elastomer.

The central elongated strength member, or kingwire, 18, shown in FIG. 2, is a circular cross-section center wire which provides strength to the core 12 during the processes of fabricating the core and the cable. A high strength copper clad steel typically is used. A typical diameter of the center wire is 0.8 millimeters. The minimum cross-sectional size of the kingwire 18 is determined by the tensile and bending strengths required for cable fabrication processes. During the cable core fabrication process, the kingwire is used as the principal strength member. The core is fabricated in two operations. During each operation, the kingwire is used for pulling the growing core through various equipments as materials are added step by step. After fabrication of the core, the cable is fabricated in two additional operations.

After the cable is completely fabricated and while the fiber communication system is being deployed to and operated on the ocean floor, the center wire 18 serves as a center conductor of a coaxial cable arrangement that is used for low frequency signalling of surveillance, maintenance and control information. Because of the coaxial center conductor function, the kingwire is selected to have a conductivity of at least 40 percent of the conductivity of an equal size wire of electrolytic copper. Some cable system may be operated without using the central strength member 18 as a center conductor for a coaxial cable arrangement. The central strength member in the cable for such system need not be clad with copper to increase conductivity.

Elastomer 22 is an optical fiber encapsulant, such as an extrusion grade thermoplastic polyester, which is supplied under the name HYTREL by the E. I. du Pont de Nemours and Co. and is applied to the kingwire 18 during the first core fabrication operation. The thermoplastic elastomer completely encapsulates several separate optical fibers for protecting them inside of the steel strand near the center of the cable. In this arrangement the fibers are located near the neutral bending axis of the cable. When the cable is placed in service, sea bottom pressure is applied essentially symmetrically to the cable. The steel strand arrangement is designed to withstand sea bottom pressure with very little deformation. Since the elastomer completely surrounds each fiber within the core, the elastomer forms a buffer for isolating each fiber from any residual localized loads resulting from sea bottom pressure. Thereby microbending of the fibers and associated optical losses caused by such microbending are minimized with respect to the effects of sea bottom pressure.

In the first core fabrication operation, the kingwire 18 is unwound from a payout reel at a controllable tension and speed. It is straightened, cleaned in trichloroethane, and heated. Two layers of the thermoplastic elastomer 22 are applied to the hot kingwire. A first layer of the elastomer in a plastic state is extruded directly over the hot kingwire. Some predetermined number, say six to twelve, glass fibers are laid helically over the first layer of the elastomer. A second layer of the elastomer also is extruded in an amorphous state. This second layer, however, is extruded over the first layer of the elastomer and the glass fibers. The second layer of elastomer merges with the first layer between the fibers thereby completely surrounding each of the fibers with the elastomer.

The first core fabrication operation is completed by passing the partially completed core through a water bath for cooling it before winding it onto a take-up reel.

In the second core fabrication operation, the outer surface of the elastomer is covered by the protective nylon sheath 23. One type of nylon used for the sheath is Zytel 153L NC 10 that is a nylon 6/12 which is supplied by E. I. du Pont de Nemours and Co. Other nylons and polyamides can be used as well. This sheath has a relatively high melting point at 213° Centigrade. The partially completed core is unwrapped from the reel, and the nylon for the sheath 23 is heated to its plastic state and is extruded over the elastomer 22. This sheath 23 completes the core which again is passed through a water bath for cooling before the completed core is wound onto a take-up reel.

Since the elastomer 22 completely surrounds the fibers 20 and the nylon sheath 23 surrounds the elastomer, the fibers track the elastomer and the nylon sheath when the cable is stretched.

A description of a method for making the cable core is presented in greater detail in a companion patent application, No. 469,428, filed concurrently herewith in the names of L. R. Caverly, Jr., et al.

Fabrication of this complete core 12 into the cable 10 of FIG. 1 is accomplished in two additional operations. The first of these operations is described with reference to FIGS. 2, 3 and 4. During the first cabling operation which is accomplished in the manufacturing line of FIG. 4, the core 12 is unreeled from a payout reel 40 and is pulled through a dancer 41 and a guide 42 to be coated with a hot melt adhesive 25 of FIG. 2 such as one named Eastman 148.

An adhesive applying station 43 of FIG. 4 heats the adhesive 25, coats the nylon sheath and wipes off any excess adhesive. In the station 43, the adhesive is heated into a range of 220°–240° Centigrade. The temperature is hot enough for the adhesive to be pumped to flow over the nylon and completely coat it but not hot enough to damage the core. By means of a hinged wiping die within the station 43, the adhesive 25 is wiped onto the nylon 23 at a uniform thickness, as shown in FIG. 2.

After the adhesive is applied to the sheath, two layers of stranded steel are laid over the adhesive. The quantity of adhesive 25 is selected to be enough for completely coating the sheath and at least partially to almost filling the interstices 27 between the sheath and the wires 13 of the first layer of stranded steel, as shown in FIG. 3. The interstices should not be filled completely. Hardening of the adhesive occurs over a period of several hours. The hardened adhesive forms a tight bond between the nylon sheath 23 and the inner layer of the steel strand 13. This bond prevents creep and assures that the fiber core tracks the steel strand during cable laying, cable recovery, and in-service operations. The adhesive is selected so that this bond does not fail during those operations.

Referring once again to FIG. 1, the cylindrical outer conductor of the low frequency signalling coaxial cable arrangement is formed by the steel strand 13 and the conductor 14, both of which are located outside of the core. The steel strand includes two layers of stranded steel wires of circular cross section.

An inner, or first, layer of the steel strand includes eight wires wrapped directly over and in contact with the outer surface of the core. These eight wires are of similar cross-sectional size laid tightly in friction contact with one another. They are laid by a first stage of a strander 45 in FIG. 4 so that they form a cylindrically shaped pressure cage in which the stranded wires press against one another continuously along their surfaces without collapsing the cylinder.

The steel stranding in the cable also includes an outer, or second, layer of sixteen steel wires which are laid over the inner stranded wires by a second stage of the strander 45. These sixteen wires are of alternate large and small diameters, as shown in FIG. 1. They are laid tightly in continuous friction contact with one another and with the wires of the inner strand. These wires of the second layer form an additional cylindrically shaped pressure cage which also holds the inner layer of wires in place. The first and second layers of steel stranding are brought together over the adhesive coated core by a closing die 47, shown in FIG. 4. The partially formed cable, including the core, adhesive and two layers of steel strand is cleaned in a bath 48 of trichloroethane before being enclosed in the conducting tube.

A nonporous conductive cylindrical tube 14 of FIG. 1 is to be formed directly over the outer layer of steel wires. It is formed by a welded seam tube of soft electrolytic copper. This highly conductive tube provides (1) a good direct current path for powering electronic repeaters which are to be spaced along the cable, (2) a moisture barrier for the fibers, and (3) in conjunction with the steel wires, the cylindrical outer conductor for the previously mentioned low frequency signalling system.

During cable fabrication in the production line of FIG. 4, a high conductivity soft copper tape 50 is cleaned, slit longitudinally to a uniform width, and rolled into a tubular shape around the steel strand by a slitter and tube forming mill 51. The tube is sized to fit loosely over the steel strand leaving a gap between the steel and the rolled-together, abutting edges of the tape. Upon leaving the tube forming mill 51, the edges of the tape are welded together into the tubular conductor 14 by a continuous seam welder 53. Immediately the conductive tube is swaged, by rolling and drawing through a swaging mill 55, down onto the outer steel strands forcing some copper into the interstices between adjacent wires in the outer steel strand, as shown in FIG. 1. This swaging of the copper into the outer interstices of the second layer of steel helps assure that the steel strand package retains its cylindrical shape, especially during cable handling operations. Swaging of the copper down onto the steel wires produces an area of contact between each wire and the copper to help retain the cylindrical shape of the strands and to assure that the steel and copper track each other during subsequent handling.

After the copper tube 14 is swaged into place, the growing cable is run through another cleaning bath 57 for a final cleaning in trichloroethane. This portion of the cable in process proceeds through a dancer 58 and is wrapped onto a take-up reel 60.

Subsequently in a separate operation, the jacket of insulation 16, shown in FIG. 1, is extruded over the copper tube 14. The jacket is formed by a low density natural polyethylene. During the process of extruding the polyethylene, the cable including the steel stranding, and the copper tube is heated to a temperature high enough for producing a polyethylene to copper bond. The polyethylene is heated to a plastic state in a temperature range of 210°-230° Centigrade so that the polyethylene flows readily during extrusion. The temperature of the copper tube is elevated to a minimum of 80° Centigrade. A bond, formed between the polyethylene and copper, is sufficiently strong so that they track one another during cable laying and recovery operations and during system service operations. Because of this bond and the tightness between the copper tube and the steel strand, the outer jacket of polyethylene and the steel strand also track one another. Since the jacket, the steel strand, and the core all track one another, the fibers are strained as much as other components of the cable. Because the fibers are proof tested to 2.0 percent strain, they can withstand the strain of cable laying and recovery operations without breaking. A description of suitable optical fibers is presented in *Proceedings of the IEEE*, pages 1280-81, September 1974; *Digest of Tech. Papers, International Conference on Integrated Optics and Optical Fiber Communications*, page 26, April 1981; *CLEO* 1981, paper W6-1, June 1981; and *IEEE Journal of Quantum Electronics*, Vol. QE-18, No. 4, pages 504-510, April 1982. Optical loss in the fibers varies only slightly with changes of tensile strain in the cable much less than changes of loss in fibers fabricated into a cable by prior methods.

FIG. 5 shows the change in optical loss in the fibers with strain in the cable. The solid line 62 represents the change of loss characteristic for the optical fibers of the cable fabricated in accordance with the instant method. A dashed line 64 represents the loss characteristic for the optical fibers of a cable fabricated in accordance with a prior art method.

The relatively small variation of optical loss as a function of strain in the disclosed cable greatly facilitates the deployment and operation of undersea communications systems.

The foregoing describes a method of fabricating an optical fiber cable. That method together with others which are made obvious to those skilled in the art are considered to be within the scope of the invention.

What is claimed is:

1. A method for fabricating an optical fiber cable comprises the steps of
   coating a cable core including optical fibers with an adhesive;
   winding at least one layer of steel wires over the adhesive on the core;
   forming a conducting tube over the layer of steel wires; and
   swaging the tube down onto the layer of steel wires.

2. A method for fabricating an optical fiber cable in accordance with claim 1 wherein
   an outer surface of the cable core is a nylon material;
   the nylon material is coated with a hot melt adhesive; and
   the adhesive is applied to the cable core at a temperature in a range of 220°-240° Centigrade.

3. A method for fabricating an optical fiber cable in accordance with claim 1 or 2 wherein
   the adhesive is wiped on the cable core at a uniform thickness which provides enough adhesive to almost fill interstices between the layer of steel wires and the surface of the cable core.

4. A method for fabricating an optical fiber cable in accordance with claim 3 wherein
   the adhesive hardens and tightly bonds the core to the layer of steel wires for preventing creep therebetween.

5. A method for fabricating an optical fiber cable in accordance with claim 1 wherein
   an outer surface of the cable core is a polyamide material;
   the polyamide material is coated with a hot melt adhesive; and
   the adhesive is applied to the cable core at a temperature in a range of 220°-240° Centigrade.

6. A method for fabricating an optical fiber cable in accordance with claim 5 wherein
   the adhesive is wiped on the cable core at a uniform thickness which provides enough adhesive to partially fill interstices between the layer of steel wires and the surface of the cable core.

7. A method for fabricating an optical fiber cable in accordance with claim 6 wherein
   the adhesive hardens and tightly bonds the core to the layer of steel wires to prevent creep therebetween.

8. A method for fabricating an optical fiber cable comprises the steps of
   coating, with a hot melt adhesive, a nylon covered cable core including optical fibers, the adhesive being applied to the cable core at a temperature in a range of 220°-240° Centigrade;
   winding at least one layer of steel wires over the adhesive on the core;
   forming a conducting tube over the layer of steel wires; and
   swaging the tube down onto the layers of steel wires.

9. A method for fabricating an optical fiber cable comprises the steps of
   coating, with a hot melt adhesive, a cable core including optical fibers, the adhesive being applied to the cable core at a temperature in a range of 220°-240° Centigrade;
   winding at least one layer of steel wires over the adhesive on the core;
   forming a conducting tube over the layer of wires; and
   swaging the tube down onto the layers of wires.

* * * * *